United States Patent [19]

Delarge et al.

[11] 3,904,636

[45] *Sept. 9, 1975

[54] 3-SULFONAMIDO-4-PHENYL AMINOPYRIDINES AND DERIVATIVES

[75] Inventors: Jacques E. Delarge, Dolembreux; Leopold Thunus, Liege; Albert Lapiere, Tongeren; Andre Georges, Ottignies, all of Belgium

[73] Assignee: A. Christiaens Societe Anonyme, Brussels, Belgium

[ * ] Notice: The portion of the term of this patent subsequent to June 25, 1991, has been disclaimed.

[22] Filed: July 24, 1973

[21] Appl. No.: 382,222

Related U.S. Application Data

[63] Continuation-in-part of Ser. No. 197,139, Nov. 9, 1971, Pat. No. 3,819,639.

[30] Foreign Application Priority Data

July 28, 1972 United Kingdom............... 35510/72

[52] U.S. Cl... 260/294.8 F; 260/243 R; 260/243 A; 260/247.1; 260/268 H; 260/294.8 R; 260/294.8 C; 260/294.9; 260/295.5 A; 260/301; 424/248; 424/250; 424/263
[51] Int. Cl.............................................. C07d 31/48
[58] Field of Search.............................. 260/294.8 F

[56] References Cited
UNITED STATES PATENTS

| | | | |
|---|---|---|---|
| 3,674,794 | 7/1972 | Mizzoni et al............... | 260/294.8 F |
| 3,819,639 | 6/1974 | Delarge et al............... | 260/294.8 F |

*Primary Examiner*—Alan L. Rotman
*Attorney, Agent, or Firm*—Sughrue, Rothwell, Mion, Zinn and Macpeak

[57] ABSTRACT

This invention relates to new 3-acylsulfonamido-4-substituted phenylamino pyridine derivatives, their preparation and their use in pharmaceutical compositions.

Said compounds exhibit valuable diuretic and/or anti-inflammatory properties.

6 Claims, No Drawings

3-SULFONAMIDO-4-PHENYL AMINOPYRIDINES AND DERIVATIVES

CROSS-RELATED APPLICATION

This application is a continuation-in-part of our earlier application Ser. No. 197,139 filed on Nov. 9, 1971, now U.S. Pat. No. 3,819,639.

BACKGROUND OF THE INVENTION

This invention relates to new derivatives of 4-phenyl-amino-pyridine, to the preparation of these derivatives and to the use thereof in the pharmaceutical field.

The new derivatives of 4-phenylaminopyridine according to this invention may be represented by the following general formula:

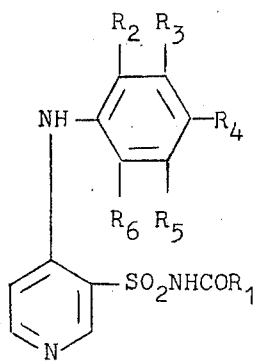

(I)

in which $R_1$ represents an alkyl radical containing 1 to 4 carbon atoms, whereas $R_2$, $R_3$, $R_4$, $R_5$ and $R_6$ represent hydrogen or a methyl, nitro, trifluoromethyl or chloro group, with the proviso that at least one of the symbols $R_2$, $R_3$, $R_4$, $R_5$ and $R_6$ does not represent hydrogen and the number of substituents other than hydrogen represented by $R_2$, $R_3$, $R_4$, $R_5$ and $R_6$ does not exceed two.

The preferred compounds of formula I are those in which $R_1$ represents an alkyl radical containing 1 to 4 carbon atoms, $R_2$ and $R_6$ represent hydrogen or a methyl, trifluoromethyl or chloro group, $R_3$ and $R_5$ represent hydrogen or a nitro, chloro or trifluoromethyl group and $R_4$ represents hydrogen or a nitro or chloro group, with the proviso that at least one of the symbols $R_2$, $R_3$, $R_4$, $R_5$ and $R_6$ does not represent hydrogen and the number of substituents other than hydrogen represented by $R_2$, $R_3$, $R_4$, $R_5$ and $R_6$ does not exceed two.

Among the new derivatives of 4-phenylaminopyridine according to this invention, the following may be cited, by way of examples:

3-acetylsulfonamido-4-(3'-trifluoromethyl)-phenylaminopyridine,
3-acetylsulfonamido-4-(3'-chloro)phenylaminopyridine,
3-acetylsulfonamido-4-(3'-chloro-2'-methyl)phenylaminopyridine,
3-acetylsulfonamido-4-(2'-trifluoromethyl)-phenylaminopyridine,
3-acetylsulfonamido-4-(3'-nitro)phenylaminopyridine,
3-acetylsulfonamido-4-(4'-chloro)phenylaminopyridine,
3-propionylsulfonamido-4-(3'-chloro)phenylaminopyridine,
3-acetylsulfonamido-4-(4'-nitro)phenylaminopyridine,
3-propionylsulfonamido-4-(3'-trifluoromethyl)-phenylaminopyridine,
3-butyroylsulfonamido-4-(3'-trifluoromethyl)-phenylaminopyridine,
3-acetylsulfonamido-4-(3',5'-dichloro)phenylaminopyridine,
3-propionylsulfonamido-4-(3',5'-dichloro)phenylaminopyridine,
3-acetylsulfonamido-4-(3',4'-dichloro)phenylaminopyridine,
3-propionylsulfonamido-4-(3',4'-dichloro)phenylaminopyridine,
3-acetylsulfonamido-4-(2',3'-dichloro)phenylaminopyridine,
3-propionylsulfonamido-4-(2',3'-dichloro)phenylaminopyridine,
3-acetylsulfonamido-4-(2',4'-dichloro)phenylaminopyridine,
3-propionylsulfonamido-4-(2',4'-dichloro)phenylaminopyridine,
3-acetylsulfonamido-4-(2',5'-dichloro)phenylaminopyridine,
3-propionylsulfonamido-4-(2',5'-dichloro)phenylaminopyridine,
3-acetylsulfonamido-4-(2',6'-dichloro)phenylaminopyridine,
3-propionylsulfonamido-4-(2',6'-dichloro)phenylaminopyridine.

This invention relates also to the preparation of compounds of the general formula I.

Said compounds may be prepared by two methods:

First method

Acylation of 3-sulfonamido-4-phenylaminopyridine (II) with carboxylic acid chlorides or anhydrides containing 2 to 5 carbon atoms, in the presence of pyridine:

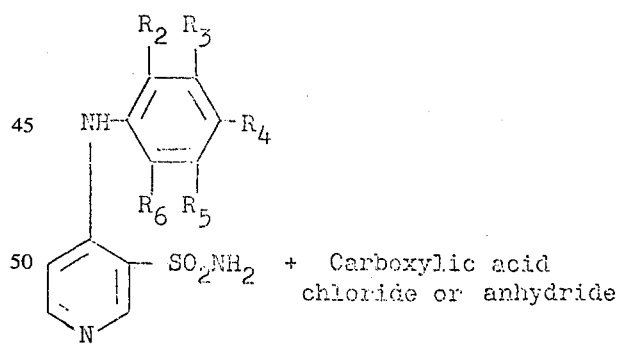

(II)

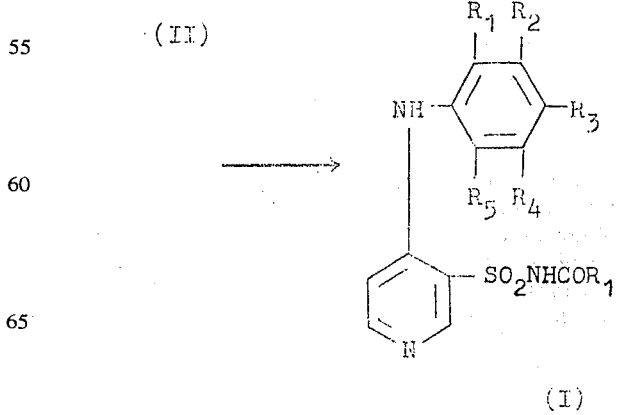

(I)

Second method

Condensation of 4-chloropyridino-5-acylsulfonamides (III) with substituted aromatic amines (IV) either in the presence of toluene and copper powder or in the absence of solvent by heating at temperatures between 80° and 150°C:

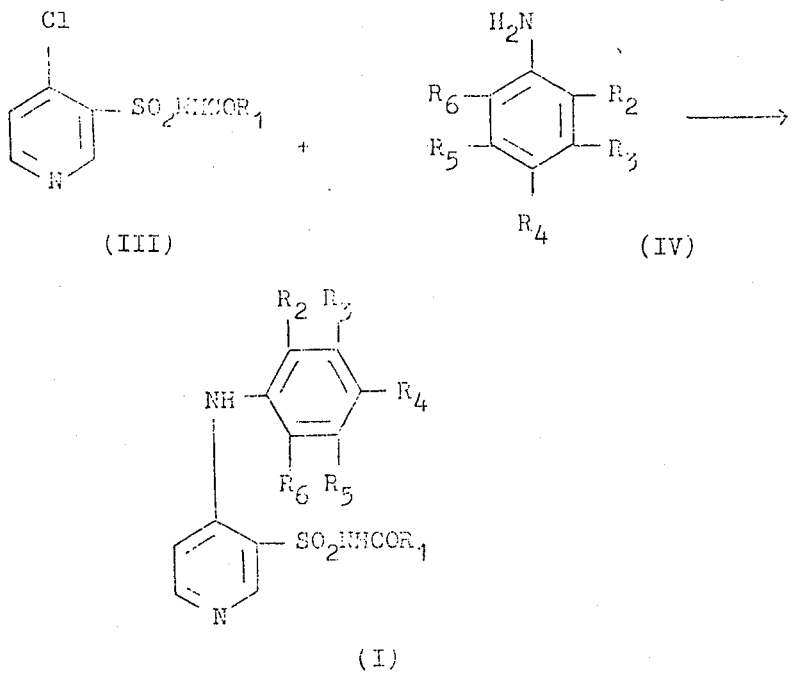

This invention also relates to pharmaceutical compositions having diuretic and/or anti-inflammatory properties, said compositions containing as active ingredient, at least one derivative of 4-phenylaminopyridine of the general formula:

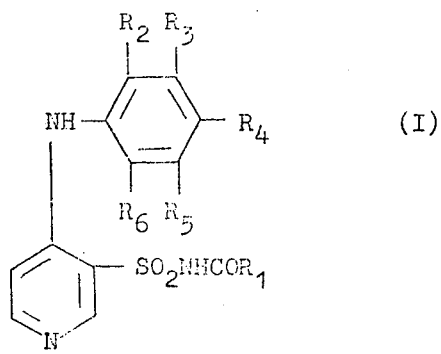

in which $R_1$ represents an alkyl radical containing 1 to 4 carbon atoms, whereas $R_2$, $R_3$, $R_4$, $R_5$ and $R_6$ represent hydrogen or a methyl, nitro, trifluoromethyl or chloro group, with the proviso that at least one of the symbols $R_2$, $R_3$, $R_4$, $R_5$ and $R_6$ does not represent hydrogen and the number of substituents other than hydrogen represented by $R_2$, $R_3$, $R_4$, $R_5$ and $R_6$ does not exceed two.

It has been found that these compounds of the formula I have outstanding diuretic and/or anti-inflammatory properties. Some of the compounds of formula I have diuretic properties which are far better than those of known diuretic compounds such as hydrochlorothiazide (ESIDREX-Registered Trademark), chlorothalidone (HYGROTON-Registered Trademark) and acetazolamide (DIAMOX-Registered Trademark).

It has been found that 3-acetylsulfonamido-4-(3'-trifluoromethyl)phenylaminopyridine (formula I, $R_1$ = $CH_3$; $R_3$ = $CF_3$; $R_2=R_4=R_5=R_6=H$), 3-propionylsulfonamido-4-(3'-trifluoromethyl)-phenylaminopyridine (formula I, $R_1 = C_2H_5$; $R_3 = CF_3$; $R_2=R_4=R_5=R_6=H$), 3-propionylsulfonamido-4-(3'-chloro)-phenylaminopyridine (formula I, $R_1 = C_2H_5$; $R_3$ = Cl; $R_2=R_4=R_5=R_6=H$), 3-acetylsulfonamido-4-(3'-chloro)phenylaminopyridine (formula I, $R_1$ = $CH_3$; $R_3$ = Cl; $R_2=R_4=R_5=R_6=H$), 3-butyroylsulfonamido-4-(3'-trifluoromethyl)phenylaminopyridine (formula I, $R_1$ = $C_3H_7$; $R_3$ = $CF_3$; $R_2=R_4=R_5=R_6=H$), 3-acetylsulfonamido-4-(4'-chloro)phenylaminopyridine (formula I, $R_1$ = $CH_3$; $R_4$ = 4'-Cl; $R_2=R_3=R_5=R_6=H$), 3-acetylsulfonamido-4-(3'-nitro)phenylaminopyridine (formula I, $R_1$ = $CH_3$; $R_3$ = $NO_2$; $R_2=R_4=R_5=R_6=H$), 3-acetylsulfonamido-4-(3'-chloro-2'-methyl)-phenylaminopyridine (formula I, $R_1$ = $CH_3$; $R_3$ = Cl; $R_2$ = $CH_3$ and $R_4=R_5=R_6=H$) and 3-acetylsulfonamido-4-(4'-chloro)phenylaminopyridine (formula I, $R_1$ = $CH_3$; $R_4$ = Cl; $R_2=R_3=R_5=R_6=H$), and 3-acetylsulfonamido-4-(3'-chloro-4'-chloro)phenylaminopyridine (formula I, $R_1$ = $CH_3$; $R_3$ = Cl; $R_4$ = Cl and $R_2=R_5=R_6=H$) have diuretic properties and may therefore be used in pharmaceutical compositions according to this invention.

Some compounds of the formula I have valuable anti-inflammatory properties which are better than those of known anti-inflammatory compounds, such as acetylsalicylic acid, phenylbutazone, flufenamic acid and niflumic acid.

It has been found that 3-acetylsulfonamido-4-(3',5'-dichloro)phenylaminopyridine (formula I, $R_1$ = $CH_3$; $R_3$ = Cl; $R_5$ = Cl and $R_2=R_4=R_6=H$), 3-propionylsulfonamido-4-(3',5'-dichloro)phenylaminopyridine (formula I, $R_1$ = $C_2H_5$; $R_2$ = Cl; $R_5$ = Cl and $R_2=R_4=R_6=H$), 3-acetylsulfonamido-4-(2',3'-dichloro)phenylaminopyridine (formula I, $R_1$ = $CH_3$; $R_2$ = Cl; $R_3$ = Cl and $R_4=R_5=R_6=H$), 3-propionylsulfonamido-4-(2',3'-dichloro)phenylaminopyridine (formula I, $R_1$ = $C_2H_5$; $R_2$ = Cl; $R_3$ = Cl and $R_4=R_5=R_6=H$), 3-acetylsulfonamido-4-(2',4'-dichloro)phenylaminopyridine (formula I, $R_1$ = $CH_3$; $R_2$ = Cl; $R_4$ = Cl and $R_3=R_5=R_6=H$), 3-propionylsulfonamido-4-(2',4'- dichloro)phenylaminopyridine (formula I, $R_1 = C_2H_5$; $R_2 = Cl$; $R_4 = Cl$ and $R_3=R_5=R_6=H$) and 3-propionylsulfonamido-4-(2',6'-dichloro)phenylaminopyridine (formula I, $R_1 = C_2H_5$; $R_2 = Cl$; $R_6 = Cl$ and $R_3=R_4=R_5=H$) have antiinflammatory properties and may therefore be used in pharmaceutical compositions according to this invention.

Finally, it has been found that some compounds of the formula I have both diuretic and anti-inflammatory properties. Among these compounds, the following may be cited: 3-acetylsulfonamido-4-(2',5'-dichloro)phenylaminopyridine (formula I, $R_1 = CH_3$; $R_2 = Cl$; $R_5 = Cl$ and $R_3=R_4=R_6=H$), 3-propionylsulfonamido-4-(2',5'-dichloro)phenylaminopyridine (formula I, $R_1 = C_2H_5$; $R_2 = Cl$; $R_5 = Cl$ and $R_3=R_4=R_6=H$) have valuable diuretic and anti-inflammatory properties and may therefore be used in pharmaceutical compositions according to this invention.

DETAILED DESCRIPTION OF THE INVENTION

The following examples illustrate the invention.

EXAMPLE 1

Preparation of
3-acetylsulfonamido-4-(3'-trifluoromethyl)-phenylaminopyridine

First method:

A mixture of 9 grams of 3-sulfonamido-4-(3'-trifluoromethyl)phenylaminopyridine, 46 milliliters of anhydrous pyridine and 45 grams of acetic anhydride is stirred in a reaction vessel, in the absence of humidity, during 24 hours at room temperature. The reaction medium is then poured onto ice and the obtained precipitate is filtered and treated by means of a concentrated solution of caustic soda. After filtering of an insoluble material, the solution is then neutralized by means of hydrochloric acid. This solution is then extracted by means of ethyl acetate and the residue obtained by evaporation is extracted with an aqueous solution of 5 percent sodium bicarbonate. After filtration and clarification by means of active carbon, the filtrate is acidified. After a few recrystallizations of the obtained precipitate, from a mixture of benzene and cyclohexane, a product is obtained (yield: 47.5 percent) which melts at 178°C.

It is possible to obtain crystals of the product with one molecule of water which is removed by drying under vacuum at 110°C.

Second method:

A solution of 0.1 mol of meta-trifluoromethylaniline in toluene is slowly added to a boiling suspension of 0.1 mol of 4-chloropyridino-5-acetylsulfonamide in toluene, in the presence of a trace of copper powder. When this addition is finished, the reaction mixture is heated during 15 minutes. After cooling, 5 parts by volume of petroleum ether (boiling point: 50°–75°C) are added. The obtained precipitate is filtered and treated with an aqueous solution of 5 percent of sodium bicarbonate. After filtration of the suspension, the filtrate clarified by means of active carbon is acidified, so that the desired product precipitates.

Third method:

0.1 mol of 4-chloropyridino-5-acetylsulfonamide and 0.1 mol of meta-trifluoromethylaniline are heated, in an open stirred vessel, in the presence of a trace of copper powder. When the temperature reaches 80°–100°C, a spontaneous heating takes place and the temperature raises quickly to 120°C. After immediate cooling, the obtained mass is dissolved in a 60:40 mixture of acetone and water. The obtained solution is filtered and evaporated to dryness. The residue is treated by a solution of 5 percent sodium bicarbonate. The obtained solution is filtered and the filtrate is acidified, so as to obtain a precipitate of the desired product.

All the methods described in this example are also generally applicable to the preparation of the compounds described in the Examples which follow hereafter.

EXAMPLE 2

Preparation of
3-propionylsulfonamido-4-(3'-trifluoromethyl)-phenylaminopyridine 9 grams of 3-sulfonamido-4-(3'-trifluoromethyl)-phenylaminopyridine, 46 milliliters of anhydrous pyridine and 45 grams of propionic anhydride are mixed at room temperature, during 24 hours, in the absence of moisture.

By using then the first method of example 1, white crystals of the desired product melting at 163°–165°C after e few recrystallizations from a mixture of cyclohexane and benzene are obtained (yield: 63 percent).

Alternatively, the same product is obtained by the second or third method of Example 1.

EXAMPLE 3

Preparation of
3-butyroylsulfonamido-4-(3'-trifluoromethyl)-phenylaminopyridine

A mixture of 1.5 grams of 3-sulfonamido-4-(3'-trifluoromethyl)phenylaminopyridine, 7.5 grams of anhydrous pyridine and 11.55 grams of butyric anhydride is stirred at room temperature, during 18 hours in the absence of moisture.

In the manner described in Example 1 (first method) white crystals melting at 158°–160°C are obtained (yield: 42 percent).

EXAMPLE 4

Preparation of
3-butyroylsulfonamido-4-(3'-trifluoromethyl)-phenylaminopyridine

A mixture of 1.5 grams of 3-sulfonamido-4-(3'-trifluoromethyl)phenylaminopyridine, 0.5 gram of butyroyl chloride and 10 milliliters of anhydrous pyridine is stirred at room temperature during 20 hours, in the absence of humidity.

The obtained mixture is then poured on ice and the precipitate is filtered. After several recrystallizations from benzene, the product melts at 158°–160°C; yield: 55 percent.

EXAMPLE 5

Preparation of
3-acetylsulfonamido-4-(3'-chloro)phenylaminopyridine

A mixture of 10 grams of 3-sulfonamido-4-(3'-chloro)phenylaminopyridine, 50 grams of anhydrous pyridine and 50 grams of acetic anhydride is stirred at room temperature during 5 hours, in the absence of humidity.

The obtained mixture is then poured on ice and the precipitate is filtered and successively treated with caustic soda and sodium bicarbonate, as described in Example 1.

White crystals melting at 218°C are obtained after several recrystallizations from a mixture of benzene and methanol with a yield of 84 percent.

EXAMPLE 6

Preparation of 3-propionylsulfonamido-4-(3'-chloro)phenylaminopyridine

The method described in Example 5 is used, except that propionic anhydride is used instead of acetic anhydride.

White crystals melting at 172°–173°C are obtained with a yield of 80 percent.

EXAMPLE 7

Preparation of 3-acetylsulfonamido-4-(3'-chloro-2'-methyl)-phenylaminopyridine

This compound is prepared as described in Example 1 (first method) by using 3-sulfonamido-4-(3'-chloro-2'-methyl)phenylaminopyridine instead of 3-sulfonamido-4-(3'-trifluoromethyl)phenylaminopyridine. White crystals melting at 212°–214°C are obtained.

EXAMPLE 8

Preparation of 3-acetylsulfonamido-4-(2'-trifluoromethyl)-phenylaminopyridine

This compound is prepared as described in Example 1. White crystals melting at 192°–193°C are obtained.

EXAMPLE 9

Preparation of 3-acetylsulfonamido-4-(3'-nitro)phenylaminopyridine

This compound is prepared as described in Example 1. The product (melting point: 212°C) crystallizes with one molecule of water which may be removed by drying under vacuum at 110°C.

EXAMPLE 10

Preparation of 3-acetylsulfonamido-4-(4'-chloro)phenylaminopyridine

By following Example 1, white crystals melting at 193°–194°C are obtained.

EXAMPLE 11

Preparation of 3-acetylsulfonamido-4-(4'-nitro)phenylaminopyridine

By following Example 1, yellow crystals melting at 230°C are obtained.

EXAMPLES 12 to 23

The compounds of the following table I have been prepared by the following method.

1 gram of a 3-sulfonamido-4-dichlorophenylaminopyridine has been maintained in contact with 5 ml of acetic or propionic anhydride in 5 ml pyridine during 1 to 3 hours. The reaction mixture has then been poured in 100 ml of a 10 percent sodium hydroxide solution. After stirring during a few minutes, the reaction mixture has been filtered and the pH has been adjusted to 5–6. After crystallization, the crystals have been collected, washed with water and dissolved in 100 ml of a 5 percent sodium bicarbonate solution in a mixture of water and ethanol (3:1). After filtration, adjustment of the pH at 5–6, the desired compound has been allowed to recrystallize. Yield: 70–90 percent.

TABLE I

| Example | Compounds of formula I$^{(x)}$ | | | Melting point °C |
|---|---|---|---|---|
| | $R_1$ | $R_2$ or $R_3$ | $R_3$, $R_4$, $R_5$ or $R_6$ | |
| 12 | $CH_3$ | 3'-Cl | 5'-Cl | 224 – 225 |
| 13 | $C_2H_5$ | 3'-Cl | 5'-Cl | 190 – 192 |
| 14 | $CH_3$ | 3'-Cl | 4'-Cl | 212 – 214 |
| 15 | $C_2H_5$ | 3'-Cl | 4'-Cl | 188 – 190 |
| 16 | $CH_3$ | 2'-Cl | 3'-Cl | 198 – 199 |
| 17 | $C_2H_5$ | 2'-Cl | 3'-Cl | 197 – 198 |
| 18 | $CH_3$ | 2'-Cl | 4'-Cl | 185 |
| 19 | $C_2H_5$ | 2'-Cl | 4'-Cl | 149 |
| 20 | $CH_3$ | 2'-Cl | 5'-Cl | 198 |
| 21 | $C_2H_5$ | 2'-Cl | 5'-Cl | 186 – 187 |
| 22 | $CH_3$ | 2'-Cl | 6'-Cl | 230 |
| 23 | $C_2H_5$ | 2'-Cl | 6'-Cl | 222 – 223 |

$^{(x)}$The not designated symbols $R_2$, $R_3$, $R_4$, $R_5$ and $R_6$ represent hydrogen.

EXAMPLE 24

Pharmacological tests for diuretic properties

Lots of 5 rats weighing 250–300 g have been constituted at random, each of them being submitted to the same treatment.

The animals fasted during 18 hours prior to the test, except for drinking water, which was provided ad libitum. On the day of the test, the compound to be tested was administred by gastric gavage at a dose of 100 mg/kg as a solution or a suspension in water containing 0,45 percent of methocel (which is an inert mucilaginous substance). Control animals received only distilled water as a placebo. At the same time, all the animals received 25 ml/kg of physiological saline by subcutaneous injection.

The rats were then placed in metabolic cages, each cage containing five animals receiving the same treatment. The urines have been collected during 4 hours.

The increase of urine volume in the treated animals compared with the urine volume of the control animals shows the diuretic action. The diuresis is expressed in ml/kg of body weight.

The results of the test are given in the following table II:

TABLE II

| Compounds | Urine volume ml/kg/4 hours |
|---|---|
| Hydrochlorothiazide (ESIDREX) | 33.0 |
| Chlorothalidone (HYGROTON) | 26.6 |
| Acetazolamide (DIAMOX) | 27.5 |
| Placebo (control animals) | 8.7 |
| Compound of example 2 | 71.7 |
| Compound of example 6 | 63.4 |
| Compound of example 5 | 60.7 |
| Compound of example 1 | 52.5 |
| Compound of example 3 | 48.0 |
| Compound of example 10 | 40.6 |
| Compound of example 9 | 25.4 |
| Compound of example 7 | 23.2 |
| Compound of example 11 | 21.9 |
| Compound of example 14 | 24.8 |
| Compound of example 20 | 40.9 |
| Compound of example 21 | 18.7 |

EXAMPLE 25

Pharmacological tests for anti-inflammatory properties

The compounds to be tested are given as freshly prepared solutions or suspensions by oral route 1 hour before injecting the pax of rats with carrageenan which is a known inflammatory agent.

The inflammatory agent (carrageenan) either in solution or suspension is then injected into the plantar tissue of the right hind paw of each rat, the left paw remaining untreated and serving as control. Each animal receives, for example, 0.05 ml of an aqueous solution containing 1 percent by weight of carrageenan and 0.9 percent of sodium chloride.

4 Hours after the injection of the inflammatory agent, the importance of swelling is determined by plethysmography and is expressed as a percent of the volume of the control paw.

The anti-inflammatory effect expressed as a percentage of inhibition is obtained by comparison between rats treated with the anti-inflammatory compound and a control group of rats.

The results of the tests performed with a number of compounds of formula I are indicated in the following table III.

TABLE III

| Compound of example | Acute oedema induced by carrageenan % of inhibition |
| --- | --- |
| 12 | 53 % |
| 13 | 22 % |
| 15 | 54 % |
| 16 | 36 % |
| 17 | 41 % |
| 18 | 20 % |
| 19 | 34 % |
| 20 | 17 % |
| 21 | 15 % |
| 23 | 13 % |
| Phenylbutazene | 41 % |
| Acetylsalicyclic acid | 0 % |
| Flufenamic acid | 34 % |
| Niflumic acid | 32 % |

EXAMPLE 26

Dragees
Core:
| | |
| --- | --- |
| Compound of formula I (such as 3-propionylsulfonamido-4-(3'-trifluoromethyl or 3'-chloro)phenylaminopyridine) | 50.0 mg |
| Colloidal silica | 5.0 mg |
| Lactose | 42.5 mg |
| Polyvinylidone | 3.6 mg |
| Glycerol | 0.5 mg |
| Maize starch | 8.0 mg |
| Talc | 10.0 mg |
| Magnesium stearate | 2.0 mg |

Coating:
| | |
| --- | --- |
| Shellac | 2.0 mg |
| Gum-arabic | 5.4 mg |
| New-coccine | 0.1 mg |
| Talc | 13.0 mg |
| Colloidal silica | 9.5 mg |
| Saccharose | 50.0 mg |
| | for one dragee |

Such dragees may be administered as diuretic drugs at a dose of 50 to 100 mg per day.

EXAMPLE 27

Tablets
| | |
| --- | --- |
| Compound of formula I | 200.0 mg |
| Colloidal silica | 17.0 mg |
| Stearic acid | 4.0 mg |
| Gelatine | 4.0 mg |
| Glycerol | 1.6 mg |
| Maize starch | 52.0 mg |
| Magnesium stearate | 1.4 mg |
| | for one tablet |

Such tablets may be administered as diuretic and/or anti-inflammatory drugs at a dose of 100–300 mg per day.

EXAMPLE 28

Capsules
| | |
| --- | --- |
| Compound of formula I | 100.0 mg |
| Lactose | 120.0 mg |
| Rice starch | 30.0 mg |
| Maize starch | 30.0 mg |
| Magnesium stearate | 5.0 mg |
| Gelatine } envelope | 78.0 mg |
| Tartrazine | 0.2 mg |
| | for one capsule |

Such capsules may be administered as diuretic and/or anti-inflammatory drugs at a dose of 200 mg per day.

EXAMPLE 29

Suppositories
| | |
| --- | --- |
| Compound of formula I | 300 mg |
| Witepsol H$_{12}$ mass (1) | 600 mg |

(1) a mixture of triglycerides and partial glycerides of saturated fatty acids (C$_{12}$-C$_{18}$) originating from plants sold by DYNAMIT NOVEL, Western Germany.

What we claim is:
1. A compound having the following general formula:

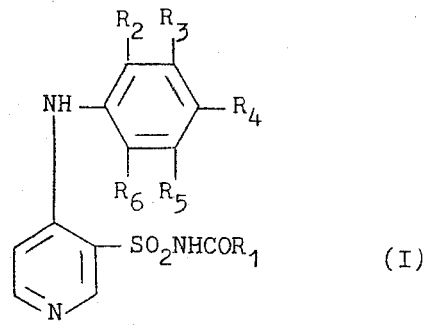

(I)

in which $R_1$ represents an alkyl group containing 1 to 4 carbon atoms, whereas $R_2$, $R_3$, $R_4$, $R_5$ and $R_6$ represent hydrogen or a methyl, nitro, trifluoromethyl or chloro group, with the proviso that at least one of the symbols $R_2$, $R_3$, $R_4$, $R_5$ and $R_6$ does not represent hydrogen and the number of substituents other than hydrogen represented by $R_2$, $R_3$, $R_4$, $R_5$ and $R_6$ does not exceed two.

2. A compound according to claim 1, in which $R_1$ represents an alkyl group containing 1 to 4 carbon atoms, $R_2$ and $R_6$ represent hydrogen or a methyl, trifluoromethyl or chloro group, $R_3$ and $R_5$ represent hydrogen or a nitro, chloro or trifluoromethyl group and $R_4$ represents hydrogen or a nitro or chloro group, with the proviso that at least one of the symbols $R_2$, $R_3$, $R_4$, $R_5$ and $R_6$ does not represent hydrogen and the number of substituents other than hydrogen represented by $R_2$, $R_3$, $R_4$, $R_5$ and $R_6$ does not exceed two.

3. A compound according to claim 2, in which $R_1$ represents an alkyl radical containing 1 or 2 carbon atoms, $R_3$ represents a chloro group and $R_2$, $R_4$, $R_5$ and $R_6$ have the meanings given in claim 2.

4. A compound according to claim 2, in which $R_1$ represents an alkyl radical containing 1 or 2 carbon atoms, whereas $R_3$ or $R_4$ represent a trifluoromethyl or chloro group, $R_2$, $R_5$ and $R_6$ having the meanings given in claim 2.

5. 3-propionylsulfonamido-4-(3'-trifluoromethyl)-phenylaminopyridine.

6. 3-propionylsulfonamido-4-(3'-chloro)phenylaminopyridine.

* * * * *